Sept. 26, 1961        H. W. CLAPPER        3,002,046
SWAGED END FOR STRANDED METAL MECHANICAL CABLE
Filed April 20, 1959        3 Sheets-Sheet 1
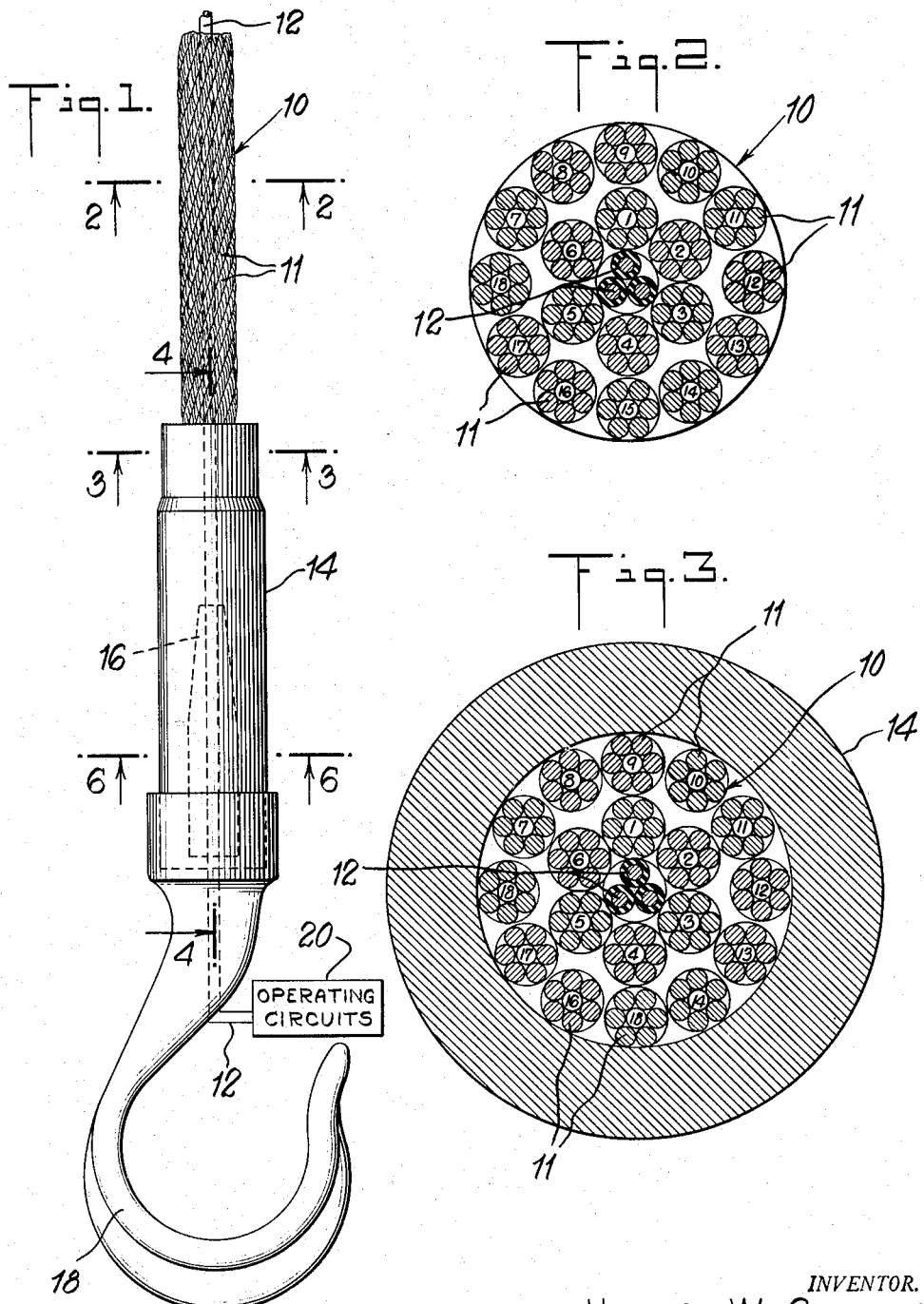
INVENTOR.
HOMER W. CLAPPER
BY
ATTORNEY Sept. 26, 1961     H. W. CLAPPER     3,002,046
SWAGED END FOR STRANDED METAL MECHANICAL CABLE
Filed April 20, 1959     3 Sheets-Sheet 2

INVENTOR.
HOMER W. CLAPPER
BY
ATTORNEY

INVENTOR.
HOMER W. CLAPPER
BY
Cyrus D. Samuelson
ATTORNEY

3,002,046
SWAGED END FOR STRANDED METAL MECHANICAL CABLE

Homer W. Clapper, Wayne, N.J.
(% Bergen Wire Rope Co., Gregg St., Lodi, N.J.)
Filed Apr. 20, 1959, Ser. No. 807,676
6 Claims. (Cl. 174—89)

My invention relates to stranded metal mechanical cable having an electrical conductor in the center thereof and in particular to a swaged end for such cable whereby it is possible to carry the electrical conductor through the swaged end to the circuits which are to be operated electrically.

In the prior art, there have been swaged ends on stranded metal mechanical cables which have an electrical conductor in the center thereof but the electrical conductor is not carried through the swaged end. Instead, it is led out of the cable prior to placing the swage sleeve around the cable and applying pressure to the combination. This is necessary because there is no protective armor around the electrical conductor to protect it from being crushed by the cable strands during the swaging process. There have been internal wedges used in the prior art but they have been made in separable halves and are not shaped to withstand the pressure which exists during the swaging process. Moreover, these wedges cannot be used in conjunction with electrical conductors which are a part of stranded metal mechanical cables because the metal strands are held from slipping by catching the ends in the threads of the fittings attached to the end of the cable and the electrical conductor would have to be led out of the cable prior to affixing the end fitting.

Accordingly, it is an important object of my invention to provide a swaged end for a stranded metal mechanical cable having an electrical conductor in the center thereof wherein the electrical conductor is carried through the swaged end to be connected to the operating circuits.

It is a further object of my invention to provide such a swaged end wherein there is no loss in breaking strength due to the swaged end.

Figure 4:
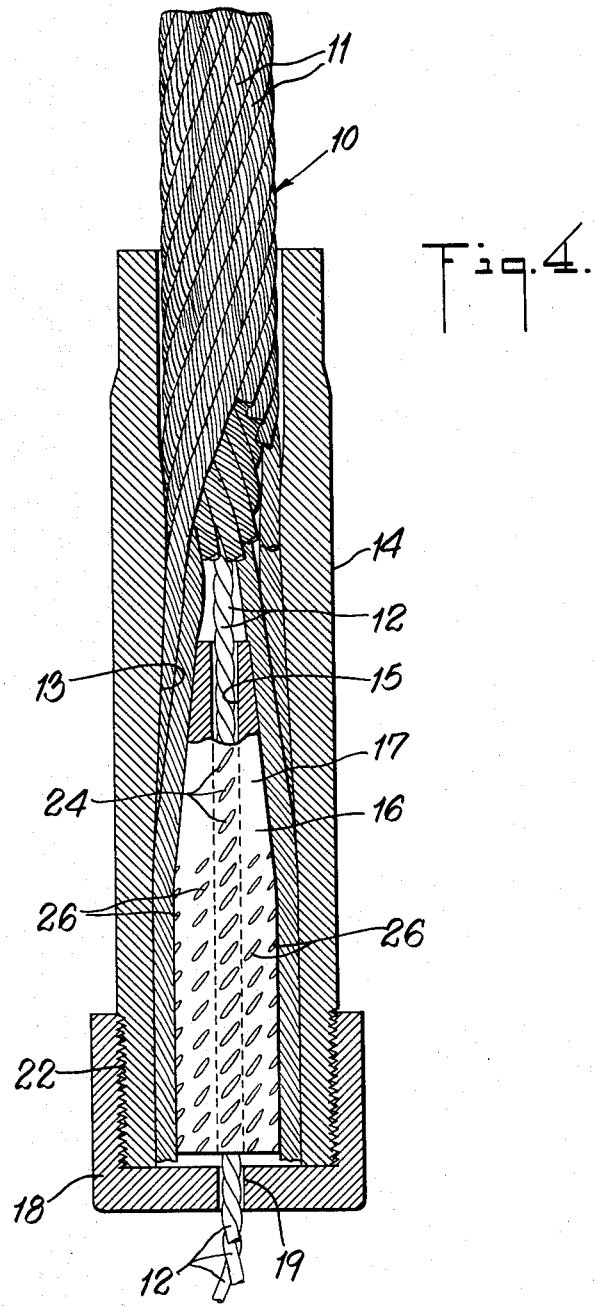
Figure 5:
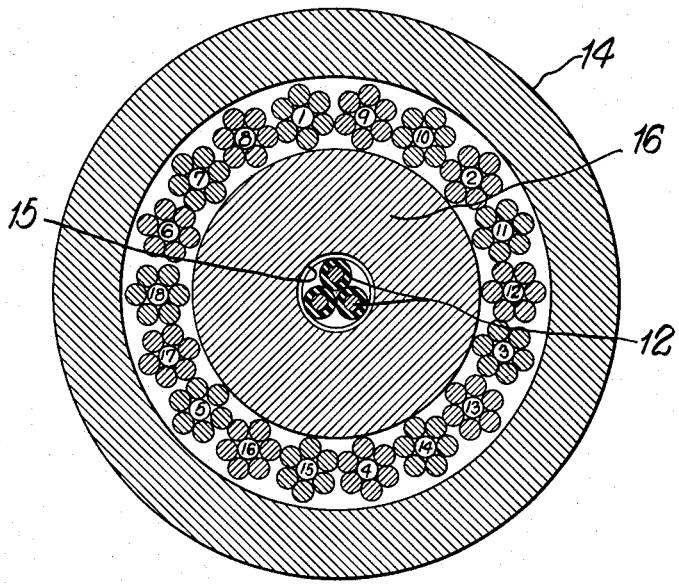
Figure 6:
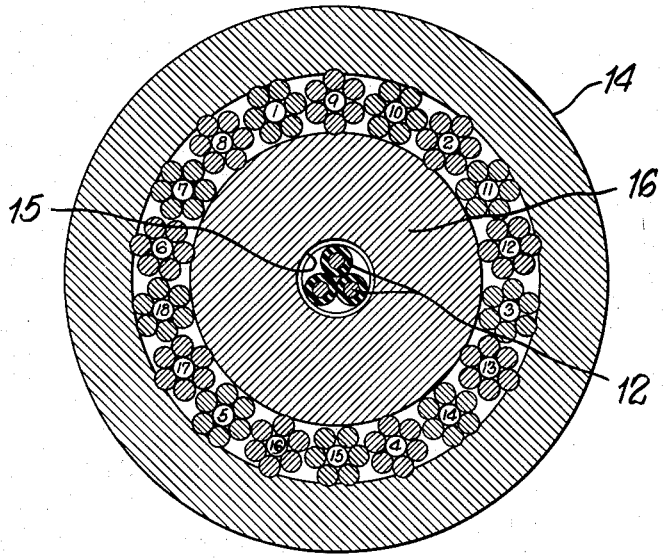

These and other objects, features and advantages will be apparent during the course of the following description when taken in connection with the accompanying drawings wherein:

FIGURE 1 is an elevational view of a swaged end of my invention showing a hook connected thereto and showing the electrical operating circuits in block form, FIGURE 2 is a cross-sectional view along the lines 2—2 of FIGURE 1, FIGURE 3 is a cross-sectional view along the lines 3—3 of FIGURE 1, FIGURE 4 is a cross-sectional view along the lines 4—4 of FIGURE 1, FIGURE 5 is a cross-sectional view along the lines 6—6 of FIGURE 1 prior to the application of pressure to the sleeve, and FIGURE 6 is a view similar to FIGURE 5 after pressure has been applied to the sleeve.

Broadly, my invention is directed toward the production of swaged ends for stranded metal mechanical cables having one or more electrical conductors running through the center of the cable. The conductors are carried through a protective central core which serves as the heart of the swaged end. The core relieves the pressure of the strands so that no pressure is placed on the conductors in the swaged end. The core may be cylindrical or tapered. If the tapered core is used, it is placed in the cable so that the tapered end is pointed toward the running portion of the cable. This tapered portion serves to carry the individual strands of the cable out to a common surface (essentially, a cylinder which is coaxial with the core). This permits the pressure to be applied equally to all the strands and insures that the breaking strength of the cable is not weakened at the swaged end. The inner surface of the sleeve is similarly tapered so that the sleeve wall is thicker at the end toward the running portion of the cable than at the other end. The inner surface of the outer sleeve is tapered to allow for the expanded diameter necessary to accommodate the core inside the cable. Swaged ended cables of my invention are used to carry a hook or other device at the end and to permit the electrical conductor to be fed through the hook or other device. For example, cables of my invention may be trailed from aircraft, helicopters, boats and other vessels with a rescue hook attached to the end of the cable. The hook may be opened and closed by the use of suitable electrical controls which are actuated by the circuits contained in the electrical conductor. By the term "electrical conductor" I mean a single wire or a plurality of wires used to transmit electrical impulses and I do not intend to limit myself to a single, individual conductor in this specification. Moreover, the electrical circuits may be employed to operate a guillotine in the event the cable becomes snagged. Cables of my invention may also be used to trail sonar, depth finding or similar equipment attached to the end of the cable from a helicopter or other aircraft or in aircraft or ship control cables.

It should be noted that a necessary element of my invention is a central core which is heavy enough to protect the electrical conductor during the swaging process and that the tapered central core is an improved embodiment over a cylindrical core.

In the drawings, wherein, for the purpose of illustration, is shown a preferred embodiment of my invention, the numeral 10 designates a stranded metal cable having a plurality of metal strands 11 and center electrical conductors 12. The swaged end of the cable is made up of sleeve 14 and metallic core 16. The end of sleeve 14 is threaded as at 22 (FIGURE 4) and hook 18 is threaded onto sleeve 14. Operating circuits 20 are electrically connected to the control point (not shown) by means of electrical conductors 12.

Referring to FIGURE 4, core 16 is shown to have a central hole 15 through which conductors 12 are fed and a taper 17 which points toward the running portion of cable 10. Sleeve 14 has a similar tapered portion 13 on its inner surface which cooperates with the taper 17 of wedge 16. Hook 18 is provided with hole 19 which is an extension of hole 15 through which conductors 12 are fed. Indentations 24 on wedge 14 are caused by an inner strand 11 and indentations 26 are caused by outer strands 11 when pressure is applied during the swaging process.

By way of example, swaged end cables of my invention having 18 or 19 strand construction are assembled as follows:

Core 16 is pushed into the end of cable 10, taking care to feed conductors 12 through opening 15. Inner strands $11_1, 11_2, \ldots 11_6$ are led out from inside the cable so that they fall between outer strands $11_7, 11_8, \ldots 11_{18}$ as shown in FIGURES 5 and 6. This operation places all the strands so that their centers are all along the same cylindrical surface which is coaxial with the axis of the core. Next, sleeve 14 is placed over the end of cable 10 with its tapered inner surface facing so that the thicker wall of the sleeve is toward the running portion of the cable. This taper 13 serves to cooperate with taper 17 and to keep the strands from slipping out of place. Next, pressure is applied to the combination in the manner well-known in the swaging art until the end becomes a unified piece which will be as strong as the cable itself. The sleeve is now threaded or similarly machined to permit the hook or other device to be attached to the end of the cable. The sleeve may be machine or otherwise prepared either before or after swaging. The electrical connections are now made to the operating circuits and the cable is ready for operation.

It can be seen from the marks 24 and 26 on the core 16 that the inner strands 11 are in contact with the core throughout all its length while the outer strands 11 do not make contact with the core until it assumes its cylindrical shape. FIGURE 5 shows the relationship of the strands and sleeve before pressure is applied and FIGURE 6 shows the same relationship after pressure is applied.

The core protects the electrical conductor and prevents pressure from being applied to the electrical conductor. Moreover, if a tapered core is used, it serves to tighten the cable if it should slip down toward the running portion of the cable because it becomes wedged more firmly among the strands.

It should be noted that the same principle taught by the instant invention applies equally well to cables having a greater or lesser number of strands or layers than the 18 or 19 strand cable herein described. In some cables, it may be necessary, because of the geometry of the cable, to insert one or more plugs having the same cross-section as the individual strands between the strands so that there are no blank or open spaces between the sleeve and the core. These plugs are inserted around the core so that the strands fall properly in place, equalize the strand loadings and keep the sleeve and the core in proper relationship with the strands.

While I have disclosed my invention in relation to a specific example and in a specific embodiment, I do not wish to be limited thereto, for obvious modifications will occur to those skilled in the art without departing from the spirit and scope of my invention.

Having thus described my invention, I claim:

1. A swaged end for a stranded metal mechanical cable having an electrical conductor in the center thereof comprising a stranded spirally wound cable, said cable being comprised of two ends and a running portion between said ends, an electrical conductor in the center of said spirally wound cable, a cylindrical metallic core, one end of said core being tapered, said core carrying an opening therein from end to end thereof and coaxial therewith, said core being inserted in the end of said cable with the tapered end thereof pointed toward the running portion of said cable, said electrical conductor being fed through and loosely contained in the opening in said core, said strands of said cable being carried out around said core such that each of them is in pressure contact with said core at the untapered end thereof, and a hollow cylindrical metallic sleeve around the outside of said cable and said core, the inner surface of said sleeve being tapered such that the wall of said sleeve is thicker toward the running portion of said cable than toward the end thereof, all of the strands of said cable being in pressure contact with the inner surface of said sleeve, said strands which are in pressure contact with said core and said sleeve being swaged thereto.

2. A swaged end for a stranded metal mechanical cable having an electrical conductor in the center thereof as described in claim 1 wherein the end of said sleeve is threaded and including threaded holding means connected to said threaded sleeve.

3. A swaged end for a stranded metal mechanical cable having an electrical conductor in the center thereof as described in claim 2 including electrical operating circuits connected to said electrical conductor and wherein said threaded holding means carries an opening therein coaxial with the opening in said core, said electrical conductor being fed through the opening in said holding means.

4. A swaged end for a stranded metal mechanical cable having an electrical conductor in the center thereof comprising a stranded spirally wound cable, an electrical conductor in the center of said spirally wound cable, a cylindrical metallic core, said core carrying an opening therein from end to end thereof and coaxial therewith, said electrical conductor being fed through and loosely contained in the opening in said core, said strands of said cable being carried out around said core such that each of them is in pressure contact with said core, and a hollow cylindrical metallic sleeve around the outside of said cable and said core, all of the strands of said cable being in pressure contact with the inner surface of said sleeve, said strands which are in pressure contact with said core and said sleeve being swaged thereto.

5. A swaged end for a stranded metal mechanical cable having an electrical conductor in the center thereof as described in claim 4 wherein the end of said sleeve is threaded and including threaded holding means connected to said threaded sleeve.

6. A swaged end for a stranded metal mechanical cable having an electrical conductor in the center thereof as described in claim 5 including electrical operating circuits connected to said electrical conductor and wherein said threaded holding means carries an opening therein coaxial with the opening in said core, said electrical conductor being fed through the opening in said holding means.

References Cited in the file of this patent

UNITED STATES PATENTS

| 1,459,047 | Crossley | June 19, 1923 |
| 2,536,003 | Dupre | Dec. 26, 1950 |
| 2,562,880 | Andrew | Aug. 7, 1951 |

FOREIGN PATENTS

| 726,054 | France | Feb. 3, 1932 |
| 904,714 | France | Mar. 19, 1945 |